United States Patent
Yamada (10) Patent No.: US 9,087,531 B1
(45) Date of Patent: Jul. 21, 2015

(54) MAGNETIC RECORDING HEAD AND DISK DEVICE WITH THE SAME

(71) Applicant: Kabushiki Kaisha Toshiba, Tokyo (JP)

(72) Inventor: Yuichi Yamada, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/470,410

(22) Filed: Aug. 27, 2014

(30) Foreign Application Priority Data

Apr. 15, 2014 (JP) .................................. 2014-083721

(51) Int. Cl.
*G11B 5/02* (2006.01)
*G11B 5/31* (2006.01)

(52) U.S. Cl.
CPC ....................................... *G11B 5/314* (2013.01)

(58) Field of Classification Search
CPC ............... G11B 2005/0021; G11B 2005/0005; G11B 5/314; G11B 11/10554; G11B 11/1058
USPC ................. 360/59, 125.31; 369/13.33, 13.13, 369/13.17, 313
See application file for complete search history.

(56) References Cited

U.S. PATENT DOCUMENTS

| 7,974,043 B2 * | 7/2011 | Shimazawa et al. ..... 360/125.31 |
| 8,054,571 B2 * | 11/2011 | Matsumoto et al. ............ 360/59 |
| 8,089,830 B2 | 1/2012 | Isogai et al. |

FOREIGN PATENT DOCUMENTS

| JP | 4520524 B | 8/2010 |
| JP | 2011-141941 A | 7/2011 |

* cited by examiner

*Primary Examiner* — Nabil Hindi
(74) *Attorney, Agent, or Firm* — Patterson & Sheridan LLP (57) ABSTRACT

A magnetic recording head includes a magnetic pole that applies a recording magnetic field to a recording medium, a light generating element configured to generate light to heat a recording surface of the recording medium, and a waveguide on a leading side of the light generating element to guide an incident light to the light generating element. The waveguide includes a first waveguide having an incident surface into which the light enters, and a second waveguide having a first surface facing the first waveguide, through which the light from the first waveguide enters, and a second surface facing the light generating element and extending substantially perpendicular to the recording surface of the recording medium, through which the light entering the light generating element passes. A refractive index of the second waveguide is different from a refractive index of the first waveguide.

20 Claims, 10 Drawing Sheets

MAGNETIC RECORDING HEAD AND DISK DEVICE WITH THE SAME

CROSS-REFERENCE TO RELATED APPLICATION

This application is based upon and claims the benefit of priority from Japanese Patent Application No. 2014-083721, filed Apr. 15, 2014, the entire contents of which are incorporated herein by reference.

FIELD

Embodiments described herein relate generally to a magnetic recording head using a thermally-assisted recording method and a disk device with the same.

BACKGROUND

One example of a disk device is a magnetic disk device that includes a magnetic disk disposed within a case as a recording medium, a spindle motor which supports and rotationally drives the magnetic disk, and a magnetic head which reads and writes information from and in the magnetic disk. The magnetic head is supported by a rotatable head actuator, moved along the radial direction of the magnetic disk, and positioned there.

Recently, magnetic recording heads according to a perpendicular magnetic recording and thermally-assisted recording have been proposed in order to increase recording density and capacity of a magnetic disk device and reduce the size thereof. This magnetic head includes a near field light generating element which generates a near field light toward a recording layer of the recording medium and a waveguide for propagating a laser light for generating the near field light. In such a magnetic recording head, when writing information, a laser light generated from a laser generating element and passing through the waveguide generates surface plasmon outside the waveguide and this surface plasmon excites plasmon in the near field light generating element. According to this, the recording layer of the recording medium is irradiated with the near field light from a distal end of the near field light generating element and locally heated, so that a coercive force is sufficiently reduced in the recording layer portion, which enables a high recording density.

In the magnetic recording head, it is difficult to obtain a high energy propagation efficiency, which is the ratio of energy propagated to the near field light generating element to the laser light energy. When the propagation efficiency is low, a high current has to be applied to the laser generating element to generate a laser light of high power in order to obtain a near field light of sufficient intensity for the thermally-assisted recording. Therefore, power consumption increases in the magnetic disk device. Further, the laser light not propagated is radiated from a terminal end of the waveguide, which may cause an unexpected heating of the recording medium and erasing of the recorded data, and also deterioration or destruction of an element caused by the heating of the waveguide.

DETAILED DESCRIPTION

Embodiments provide a magnetic recording head capable of thermally-assisted recording with high efficiency and stability and a disk device including the same.

In general, according to one embodiment, a magnetic recording head includes a magnetic pole that applies a recording magnetic field to a recording medium, a light generating element configured to generate light to heat a recording surface of the recording medium, and a waveguide on a leading side of the light generating element to guide an incident light to the light generating element. The waveguide includes a first waveguide having an incident surface into which the light enters, and a second waveguide having a first surface facing the first waveguide, through which the light from the first waveguide enters, and a second surface facing the light generating element and extending substantially perpendicular to the recording surface of the recording medium, through which the light entering the light generating element passes. A refractive index of the second waveguide is different from a refractive index of the first waveguide.

Embodiments will be described with reference to the following drawings.

First Embodiment

Figure 1:
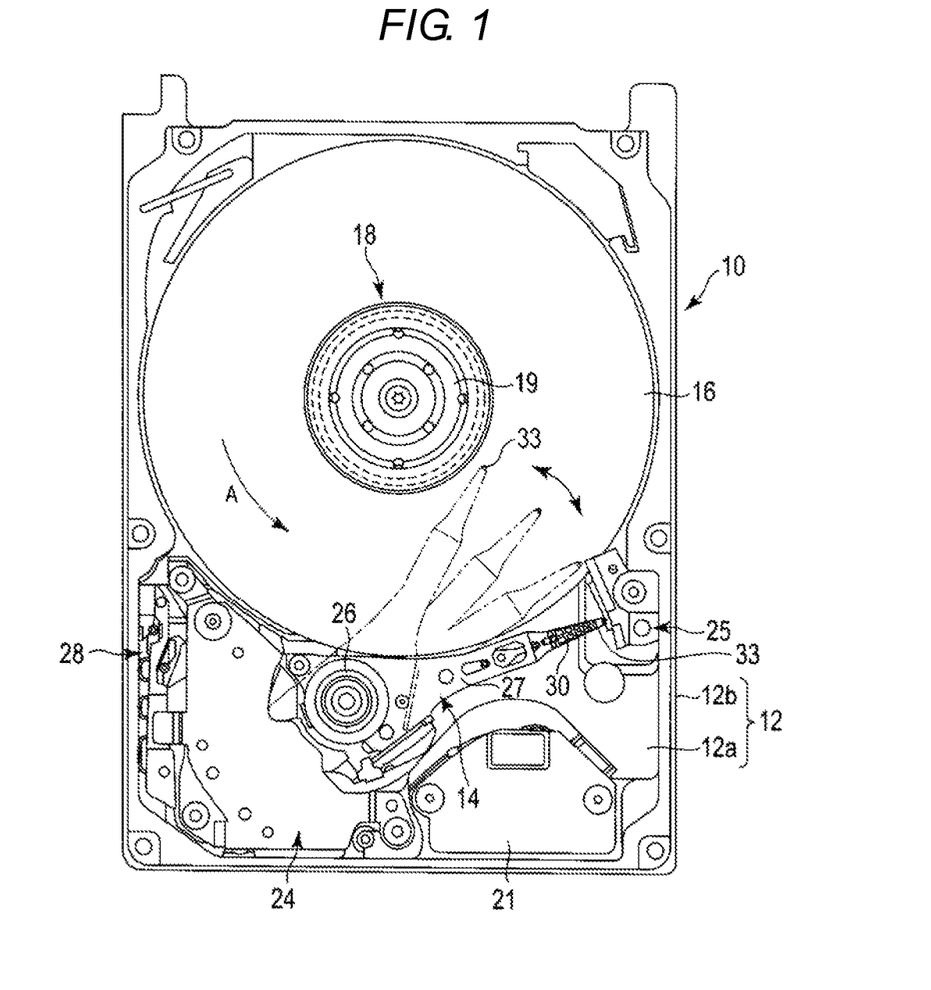
FIG. 1 is a top plan view illustrating a hard disk drive (HDD) according to a first embodiment.
Figure 2:
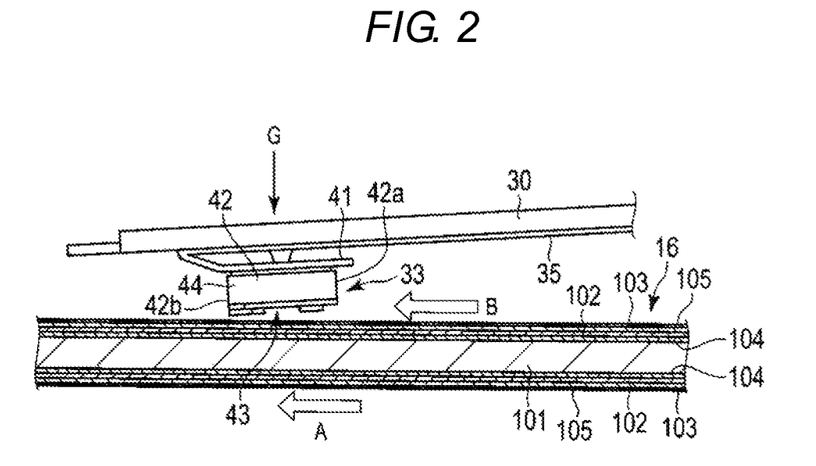
FIG. 2 is a side elevation view illustrating a magnetic head and a suspension in the HDD.

FIG. 1 illustrates the inner structure of an HDD according to a first embodiment with a top cover thereof removed therefrom, and FIG. 2 illustrates a magnetic head in a floating state. As illustrated in FIG. 1, the HDD includes a casing 10. This casing 10 includes a base 12 in a shape of a rectangular box that is open-topped and a top cover, not illustrated, in a shape of a rectangular plate. The top cover is screwed on the base 12 by a plurality of screws so as to close the top opening of the base 12. The base 12 is formed by a rectangular bottom wall 12a and a side wall 12b standing along the periphery of the bottom wall.

On the bottom wall 12a of the base 12, there are provided a magnetic disk 16 as a magnetic recording medium and a mechanism portion. The mechanism portion includes a spindle motor 18 which supports and rotates the magnetic disk 16, a plurality of, for example, two magnetic heads 33 which record and reproduce information to and from the magnetic disk 16, a carriage assembly 14 which movably supports the magnetic heads 33 with respect to a surface of the magnetic disk 16 (disk surface), and a voice coil motor (hereinafter, referred to as VCM) 24 which rotates and positions the carriage assembly 14. On the bottom wall 12a, a ramp load mechanism 25 which holds the magnetic heads 33 at a position far from the magnetic disk 16 when the magnetic heads 33 are moved to the outermost periphery of the magnetic disk 16, a latch mechanism 28 which holds the carriage assembly 14 at an evacuation position when an impact or the like is applied to the HDD, and a board unit 21 where electronic components such as a connector and the like are mounted.

A control circuit board, not illustrated, is screwed on an outer surface of the base 12. The control circuit board controls the operations of the spindle motor 18, the VCM 24, and the magnetic heads 33 through the board unit 21.

As illustrated in FIG. 1, the magnetic disk 16 is coaxially fitted on a hub of the spindle motor 18 and clamped by a clamp spring 19 screwed to an upper end of the hub so that the magnetic disk 16 is fixed to the hub. The magnetic disk 16 is rotated by the spindle motor 18 used as a drive motor in a direction indicated by an arrow A at a predetermined speed.

The carriage assembly 14 includes a bearing portion 26 fixed on the bottom wall 12a of the base 12 and a plurality of arms 27 extending from the bearing portion 26. These arms are positioned in parallel to the disk surface at predetermined intervals, extending in the same direction from the bearing portion 26. The arms 27 may be integrated with the sleeve of the bearing portion 26 and formed in an E-block.

The carriage assembly 14 includes elastically deformable suspensions 30 each having a shape of long plate. Each suspension 30 is formed by a plate spring, with a proximal end thereof fixed to a distal end of the arm 27 by spot welding or adhesion, and extends from the arm 27. The respective suspensions 30 may be integrally formed with the respectively corresponding arms 27. The magnetic heads 33 are supported at the extending ends of the respective suspensions 30. The arm 27 and the suspension 30 form a head suspension, and the head suspension and the magnetic head 33 form a head suspension assembly.

As illustrated in FIG. 2, each magnetic head 33 includes a substantially rectangular parallelepiped shaped slider 42 and a head portion 44 for recording and reproducing, provided at the outflow end (trailing end) of this slider 42. The magnetic head 33 is fixed to a gimbal spring 41 provided in a distal end portion of the suspension 30. A head load G directing toward the disk surface is applied to each magnetic head 33, due to the elasticity of the suspension 30. The two arms 27 are positioned in parallel to each other at a predetermined interval, and the suspensions 30 attached to the arms 27 and the magnetic heads 33 face each other with the magnetic disk 16 interposed therebetween.

Each magnetic head 33 is electrically connected to the board unit 21 through a relay flexible printed circuit board (hereinafter, referred to as a relay FPC) 35 fixed to the suspension 30 and the arm 27.

By passing a current to the voice coil of the VCM 24 in a state where the magnetic disk 16 is rotating, the carriage assembly 14 rotates and the magnetic head 33 is moved and positioned above a desired track of the magnetic disk 16. In these circumstances, as illustrated by a chain double-dashed line in FIG. 1, the magnetic head 33 is moved along the radial direction of the magnetic disk 16 between an inner peripheral portion and an outer peripheral portion of the magnetic disk 16.

Figure 3:
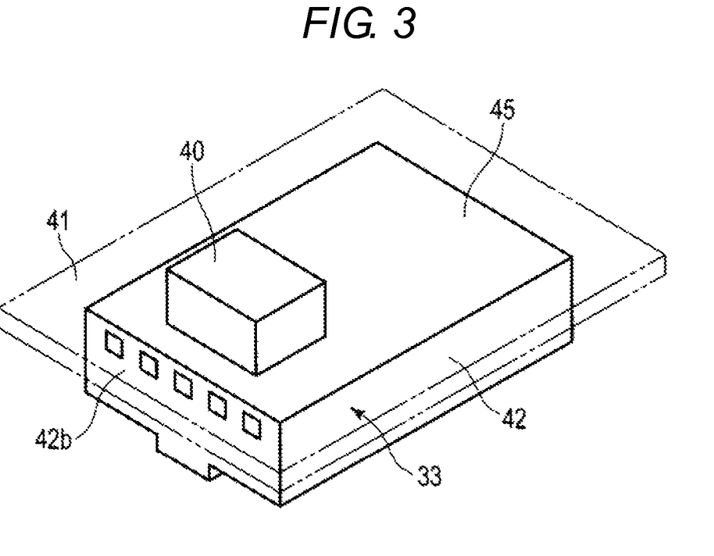
FIG. 3 is a perspective view schematically illustrating the magnetic head.

Next, the structure of the magnetic disk 16 and the magnetic head 33 will be described in detail. FIG. 3 is a perspective view schematically illustrating the entire magnetic head, FIG. 4 is a cross-sectional view of the magnetic head portion, and FIG. 5 is an enlarged cross-sectional view illustrating the head portion 44 of the magnetic head 33 and the magnetic disk 16.

Figure 5:
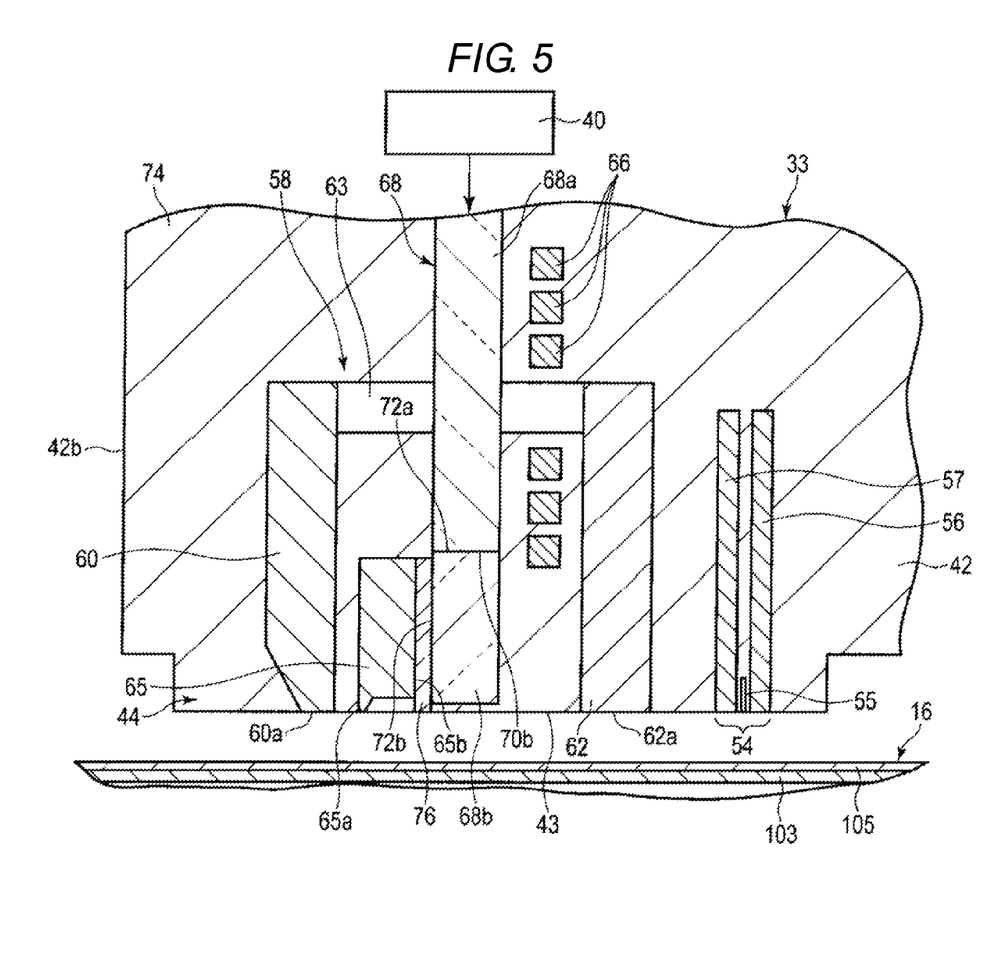
FIG. 5 is an enlarged cross-sectional view illustrating a head portion of the magnetic head.

As illustrated in FIGS. 1, 2, and 5, the magnetic disk 16 includes a substrate 101 which is formed in a disk shape, for example, with a diameter of about 2.5 inches (6.35 cm) and made of a non-magnetic body. Each surface of the substrate 101 is provided with a perpendicular recording layer 103 having a strong anisotropy in a perpendicular direction to the disk surface, a crystal orientation layer 102 arranged in the underlying portion of the perpendicular recording layer 103 in order to improve the orientation of the perpendicular recording layer 103, a heat sink layer 104 arranged in the underlying portion of the crystal orientation layer 102 in order to restrain a spread of a heated area, and a protective film 105 arranged on the upper portion of the perpendicular recording layer 103.

Figure 4:
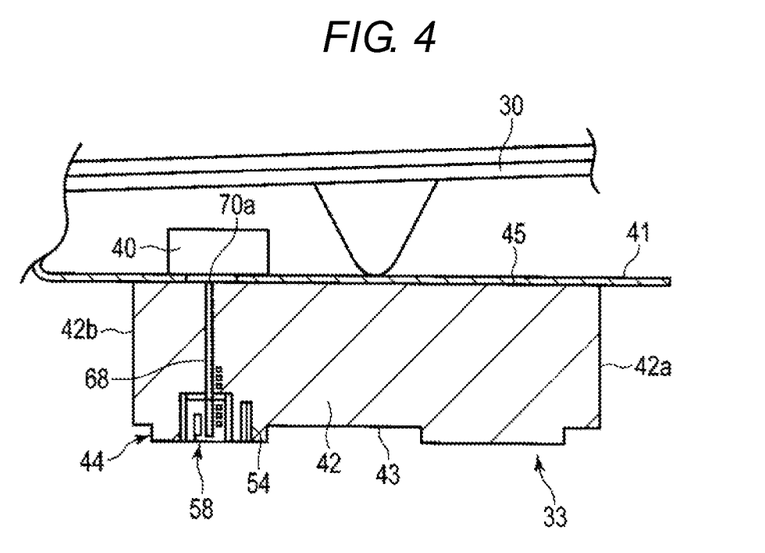
FIG. 4 is a cross-sectional view illustrating the magnetic head.

As illustrated in FIGS. 2 and 4, the magnetic head 33 is formed as a floating type head, having a slider 42 formed substantially in a rectangular parallelepiped shape and a head portion 44 formed at an end of the slider 42 on the outflow (trailing) side. The slider 42 is made of, for example, a sintered body of alumina and titanium carbide (ALTIC), and the head portion 44 is formed by laminating thin films.

The slider 42 has a rectangular floating surface (Air Bearing Surface (ABS)) 43 facing the disk surface and a rectangular slider supporting surface 45 on the opposite to the floating surface. The slider supporting surface 45 of the slider 42 is fixed to a gimbal 41. Further, a laser generating element (laser diode) 40 is mounted on the slider supporting surface 45 or the gimbal 41 as a light source.

The slider 42 floats due to an air flow B generated between the disk surface and the floating surface 43 according to the rotation of the magnetic disk 16. The direction of the air flow B coincides with the rotation direction A of the magnetic disk 16. The slider 42 is arranged such that the longitudinal direction of the floating surface 43 almost coincides with the direction of the air flow B, on the disk surface.

The slider 42 has a leading end 42a positioned on the inflow side of the air flow B and a trailing end 42b positioned on the outflow side of the air flow B. On the floating surface 43 of the slider 42, a concave and convex structure (leading step, trailing step, side step, negative-pressure cavity, and the like), not illustrated, is formed.

As illustrated in FIGS. 4 and 5, the head portion 44, including a reproducing head 54 and a recording head (magnetic recording head) 58 formed at the trailing end 42b of the slider 42 in a thin film process, is formed as a separate type magnetic head.

The reproducing head 54 is formed by a magnetic film 55 having a magneto-resistive effect and shield films 56 and 57 respectively arranged on the leading side and the trailing side of the magnetic film 55 to sandwich the same film. The lower ends of the magnetic film 55 and the shield films 56 and 57 are exposed on the floating surface 43 of the slider 42.

The recording head 58 is provided nearer to the trailing end 42b side of the slider 42 than the reproducing head 54. The recording head 58 includes a main magnetic pole 60 made of a soft magnetic material having a high permeability and a high saturation flux density to generate a recording magnetic field in a perpendicular direction to the disk surface (with respect to the recording layer 103), a leading yoke 62 which is made of a soft magnetic material for passing a magnetic flux to the main magnetic pole 60 and positioned on the leading side of the main magnetic pole 60, a joint portion 63 for physically connecting the top portion of the leading yoke 62 (the end distant from the floating surface 43) to the main magnetic pole 60, a recording coil 66 wound around a magnetic path including the leading yoke 62 and the main magnetic pole 60 in order to pass a magnetic flux to the main magnetic pole 60, a near field light generating element (plasmon generator, near-field transducer) 65 provided on the leading side of the main magnetic pole 60 to generate a near field light for heating the recording layer 103 of the magnetic disk 16, and a waveguide 68 for guiding a light for generating a near field light to the near field light generating element 65. The near field light generating element 65 is a light generating element which generates a light directed toward the magnetic disk 16 and is made of a metallic body, e.g., gold. The waveguide 68 propagates a light for generating a near field light to the near field light generating element 65. A distal end surface 60a of the main magnetic pole 60, a distal end surface 62a of the leading yoke 62, and a plasmon antenna 65a of the near field light generating element 65 are exposed on the floating surface 43 of the slider 42.

The waveguide 68 includes a first waveguide 68a extending from the slider supporting surface 45 of the slider 42 to the vicinity of the near field light generating element 65 toward the floating surface 43 and a second waveguide 68b extending from the lower end of this first waveguide 68a to the vicinity of the floating surface 43. The first and the second waveguides 68a and 68b extend in a direction substantially perpendicular to the floating surface 43.

The first waveguide 68a includes a first incident surface 70a positioned on the slider supporting surface 45 of the slider 42 and a first emitting surface 70b in the lower end. The first emitting surface 70b is formed substantially in parallel to the floating surface 43, facing the laser generating element 40. The second waveguide 68b includes a second incident surface 72a at the upper end in parallel to the slider supporting surface 45 and a second emitting surface 72b extending perpendicular to this second incident surface 72a. The second incident surface 72a of the second waveguide 68b abuts on the first emitting surface 70b of the first waveguide 68a, that is, are joined together. According to this, the first waveguide 68a and the second waveguide 68b continuously extend in a straight line shape. The second emitting surface 72b of the second waveguide 68b extends substantially perpendicular to the floating surface 43 and faces the near field light generating element 65.

The first waveguide 68a and the second waveguide 68b are made of materials having different refractive indices. In the embodiment, the second waveguide 68b is made with a refractive index lower than that of the first waveguide 68a. The first waveguide 68a is made of, for example, titanium oxide with a refractive index 2.5 and the second waveguide 68b is made of magnesium oxide with a refractive index 1.8.

The near field light generating element 65 is formed substantially in a prism shape, including the plasmon antenna 65a protruding from its lower end and being exposed on the floating surface 43, a third incident surface 65b facing the second waveguide 68b, and the other side surface opposite to this third incident surface 65b. The third incident surface 65b extends from the vicinity of the floating surface 43 substantially perpendicular to the floating surface. The third incident surface 65b faces and is parallel to the second emitting surface 72b of the second waveguide 68b with a gap therebetween. A low refractive index layer 76 is provided in this gap between the third incident surface 65b of the near field light generating element 65 and the second emitting surface 72b of the second waveguide 68b. The low refractive index layer 76 is made of a material with a refractive index lower than that of the second waveguide 68b, for example, silicon oxide. The second waveguide 68b may be surrounded by a silicon oxide layer.

Figure 7:
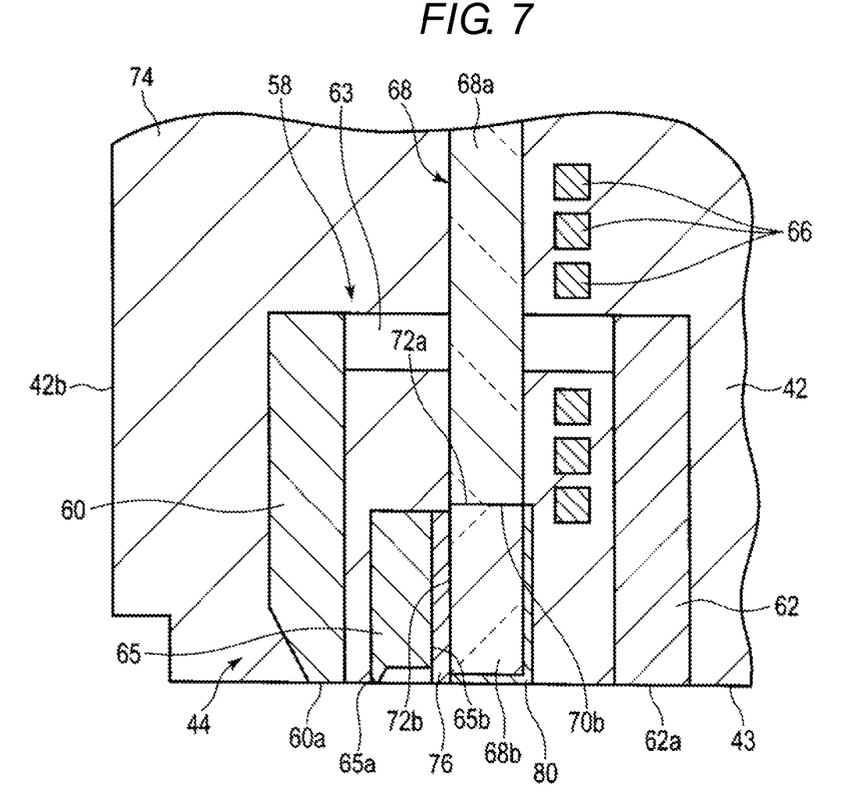
FIG. 7 is a cross-sectional view schematically illustrating a magnetic recording head according to a modified example.
Figure 8:
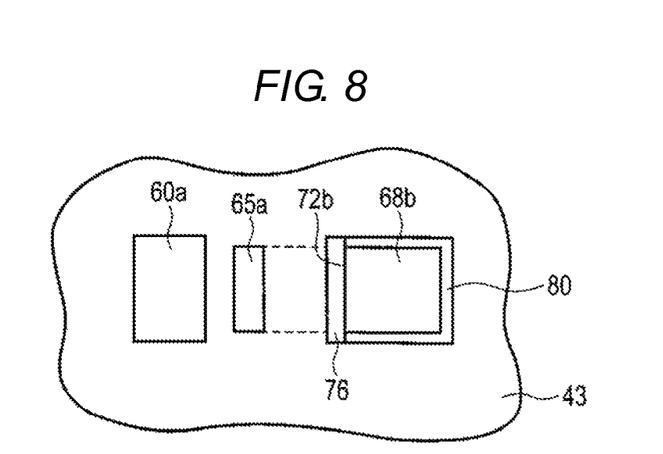
FIG. 8 is a top plan view of the magnetic recording head according to the modified example viewed from the side of a floating surface.

Further, as illustrated in FIGS. 7 and 8, the second waveguide 68b may be surrounded by a clad layer 80, except for the second emitting surface 72b. This clad layer 80 is made of a material with a refractive index lower than that of the low refractive index layer 76.

As illustrated in FIGS. 4 and 5, the reproducing head 54 and the recording head 58 are covered with a nonmagnetic protective insulating film 74, except for the portion exposed to the floating surface 43 of the slider 42. The protective insulating film 74 forms an outer shape of the slider 42.

A current to be supplied to the recording coil 66 of the recording head 58 and a driving current of the laser generating element 40 are controlled by a control circuit board (control unit) of the HDD. When writing signals in the recording layer 103 of the magnetic disk 16, a predetermined current is supplied from a power source to the recording coil 66, to pass a magnetic flux to the main magnetic pole 60 and generate a magnetic field. Further, a laser light (excitation light) generated from the laser generating element 40 as a light source enters the waveguide 68 and is supplied to the near field light generating element 65 through the waveguide 68.

According to the HDD configured as mentioned above, by driving the VCM 24, the carriage assembly 14 rotates and the magnetic head 33 is moved and positioned above a predetermined track of the magnetic disk 16. Further, the magnetic head 33 floats due to the air flow B generated between the disk surface and the floating surface 43 according to the rotation of the magnetic disk 16. During the operation of the HDD, the floating surface 43 of the slider 42 is kept facing the disk surface with a gap. In this state, recorded information is read from the magnetic disk 16 by the reproducing head 54 and information (signals) is written in the magnetic disk 16 by the recording head 58.

During writing of information, the recording coil 66 excites the main magnetic pole 60, and by applying a recording magnetic field in a perpendicular direction to the recording layer 103 of the magnetic disk 16 right below the main magnetic pole 60, the information is recorded with a desired track width. Further, a laser light is supplied from the laser generating element 40 to the near field light generating element 65 through the waveguide 68, to generate a near field light from the near field light generating element 65. By locally heating the recording layer 103 of the magnetic disk 16 with the near field light generated from the plasmon antenna 65a of the near field light generating element 65, a coercive force in the recording layer portion is reduced. A recording magnetic field from the main magnetic pole 60 is applied to this coercive force reduced area, to write a signal there. Thus, high density magnetic recording is enabled by writing a signal in the area of the recording layer 103 locally heated, with the coercive force reduced. The plasmon antenna 65a of the near field light generating element 65 is provided near the distal end portion 60a of the main magnetic pole 60, because the magnetic field from the magnetic head 33 should be applied to the magnetic disk 16, before the magnetic disk 16 heated by the laser light is cooled down and the coercive force is recovered.

When a near field light is applied from the near field light generating element 65 to the magnetic disk 16, a laser light from the laser generating element 40 propagates through the first waveguide 68a while being repeatedly reflected on the inner wall surface (side surface or peripheral surface) of the core of the first waveguide 68a and enters the second waveguide 68b through the first emitting surface 70b and the second incident surface 72a. This laser light propagates through the second waveguide 68b while being repeatedly reflected on the inner wall surface of the core of the second waveguide 68b. When the laser light is reflected on the second emitting surface 72b of the second waveguide 68b, the reflected light generates a surface plasmon outside the second emitting surface 72b (outside the second waveguide 68b) and at the third incident surface 65b of the near field light generating element 65. The surface plasmon generated at the third incident surface 65b of the near field light generating element 65 is excited by the near field light generating element 65 to move towards the plasmon antenna 65a and become concentrated at the plasmon antenna 65a. From there, the near field light generating element 65 irradiates the recording layer 103 of the magnetic disk 16 with a near field light generated by the plasmon antenna 65a.

In view of the characteristics required for the waveguide 68, it is important to propagate a laser light generated in the laser generating element 40, without loss, from the vicinity of the laser generating element 40 to just before the near field light generating element 65. To achieve this, it is preferable that the reflection angle of the laser light reflected on the inner wall surface of the core of the waveguide 68 is 70° and more with respect to a line perpendicular to the wall surface. On the other hand, in order to propagate energy from the waveguide 68 to the near field light generating element 65, it is most efficient that the reflection angle of the laser light reflected on the inner wall surface of the core of the waveguide 68 is about 40° to 50° with respect to the line perpendicular to the wall surface.

Figure 6:
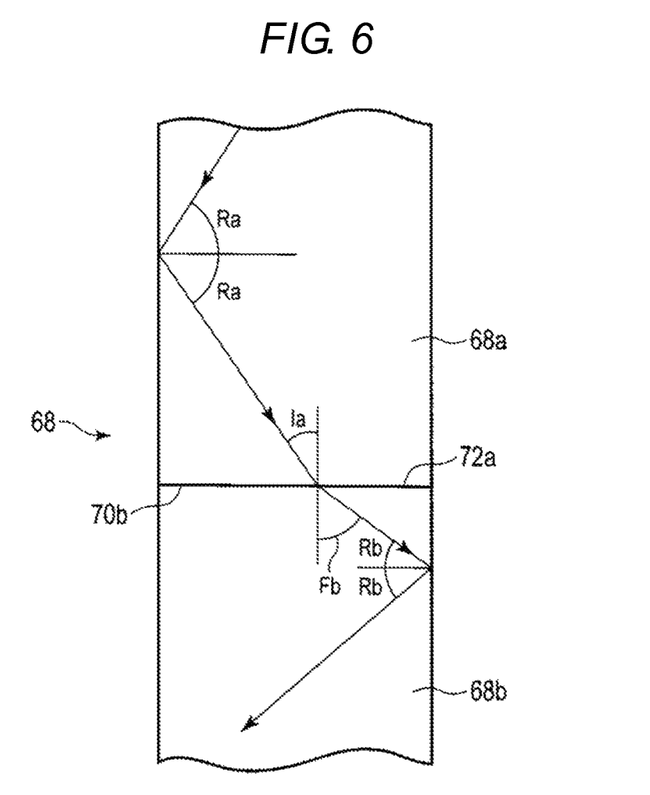
FIG. 6 is a view schematically illustrating a waveguide of the magnetic head according to the first embodiment.

In the magnetic recording head 58 according to the embodiment, the first waveguide 68a of the waveguide 68 is formed with a refractive index higher than that of the second waveguide 68b. Therefore, as illustrated in FIG. 6, the laser light incident to the first waveguide 68a propagates through the first waveguide 68a while being repeatedly reflected on the inner wall surface (side surface or peripheral surface) of the core of the first waveguide 68a with a reflection angle Ra of 70° to 80° with respect to the line perpendicular to the wall surface. According to this, the first waveguide 68a can propagate the laser light to the vicinity of the near field light generating element 65 with a small propagation loss.

The laser light propagating through the first waveguide 68a passes the first emitting surface 70b and the second incident surface (boundary) 72a and enters the second waveguide 68b. Here, since the refractive index of the second waveguide 68b is lower than that of the first waveguide 68a, refraction occurs in the first emitting surface 70b and the second incident surface 72a, a refractive angle Fb on the second incident surface 72a becomes larger than the incident angle Ia on the first emitting surface 70b. According to this, the reflection angle Rb of the laser light reflected on the inner wall surface (side surface or peripheral surface) of the core of the second waveguide 68b becomes smaller than the angle of 70° to 80° with respect to the line perpendicular to the wall surface, within the second waveguide 68b. For example, when the first waveguide 68a is made of titanium oxide with a refractive index 2.5 and the second waveguide 68b is made of magnesium oxide with a refractive index 1.8, the reflection angle Ra=80° in the first waveguide 68a is changed to the reflection angle Rb=76° in the second waveguide 68b, or the reflection angle Ra=70° in the first waveguide 68a is changed to the reflection angle Rb=62° in the second waveguide 68b.

As mentioned above, while restraining the propagation loss of the laser light in the first waveguide 68a, energy can be propagated from the second waveguide 68b to the near field light generating element 65 efficiently. Accordingly, it is not necessary to apply a high current to the laser generating element 40 to generate a high power laser light, thereby reducing the power consumption of the magnetic disk device. At the same time, the laser light is prevented from radiating from the waveguide terminal end, and therefore, unexpected heating of a recording medium and erasing of the data can be prevented. According to the above, a magnetic recording head capable of thermally-assisted recording with high efficiency and stability and a disk device including the same can be obtained.

Further, as illustrated in a modified example of FIGS. 7 and 8, when the peripheral outer surface of the second waveguide 68b, except for the second emitting surface 72b of the second waveguide 68b, is covered with the clad layer 80 made of a material with a low refractive index, a laser light is prevented from radiating outward from the second waveguide 68b and almost all the laser light can be reflected on the side of the second emitting surface 72b. According to this, energy can be propagated to the near field light generating element 65 more efficiently.

The material for making the first waveguide 68a and the second waveguide 68b is not restricted to that in the above mentioned embodiment, but various kinds of materials can be selected. As the material with a low refractive index, for example, gallium oxide, aluminum oxide, magnesium oxide, yttrium oxide, and hafnium oxide can be used. As the material with a high refractive index, for example, tantalum oxide, niobium oxide, titanium dioxide, and titanium monoxide can be used.

Further, various combinations of refractive indices may be selected. It is preferable that the ratio (n1/n2) of the refractive index n1 of the first waveguide 68a and the refractive index n2 of the second waveguide 68b is 1.3 and more. For example, when the refractive index of the first waveguide 68a is 2.5 and the refractive index of the second waveguide 68b is 1.5, the following change amount in the reflection angle is obtained as shown in Table 1.

TABLE 1

| Unit: degree | | | | |
|---|---|---|---|---|
| Reflection Angle Ra | Incident Angle Ia | Refractive Angle Fb | Reflection Angle Rb | Change Amount in Reflection Angle |
| 80.0 | 10.0 | 16.8 | 73.2 | −6.8 |
| 70.0 | 20.0 | 34.8 | 55.2 | −14.8 |

Further, when the refractive index of the first waveguide 68a is 2.5 and the refractive index of the second waveguide 68b is 1.8, the following change amount in the reflection angle is obtained as shown in Table 2.

TABLE 2

| Unit: degree | | | | |
|---|---|---|---|---|
| Reflection Angle Ra | Incident Angle Ia | Refractive Angle Fb | Reflection Angle Rb | Change Amount in Reflection Angle |
| 80.0 | 10.0 | 14.0 | 76.0 | −4.0 |
| 70.0 | 20.0 | 28.4 | 61.6 | −8.4 |

Next, an HDD and a magnetic recording head according to other embodiments will be described. In the other embodiments described later, the same reference codes are attached to the portions identical to the above mentioned first embodiment and their detailed description is omitted.

Second Embodiment

Figure 9:
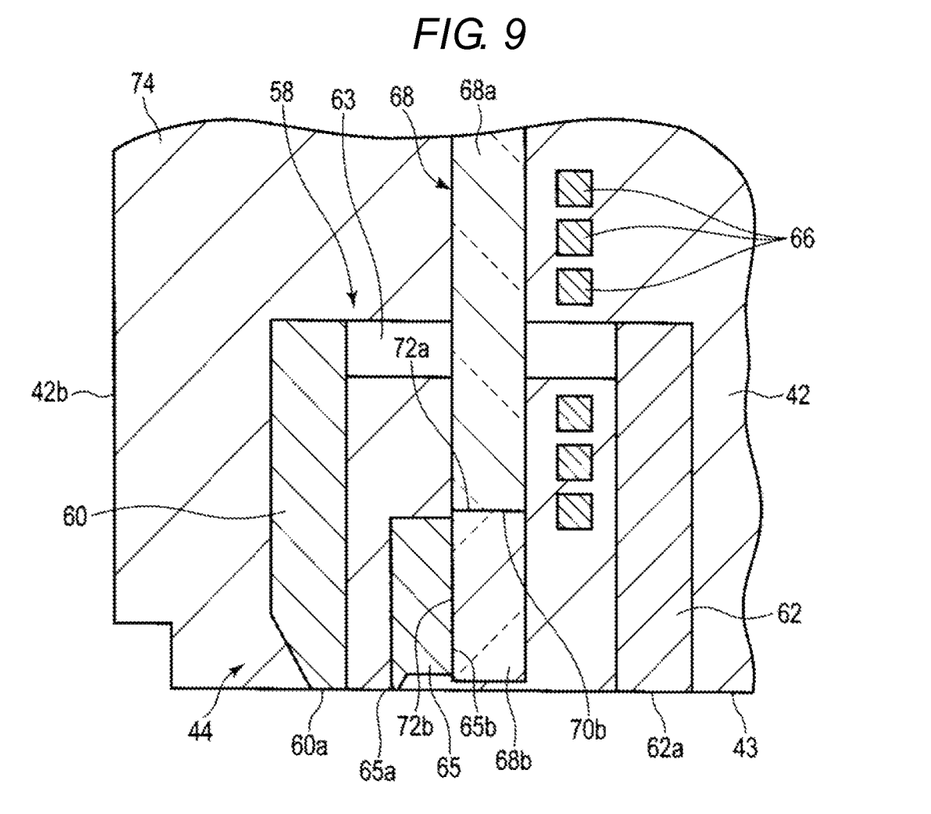
FIG. 9 is an enlarged cross-sectional view of a head portion of a magnetic head in an HDD according to a second embodiment.

FIG. 9 is an enlarged cross-sectional view illustrating a magnetic recording head in the HDD according to a second embodiment. According to the embodiment, the third incident surface 65b of the near field light generating element 65 faces and is parallel to the second emitting surface 72b of the second waveguide 68b and is in contact with or joined with the second emitting surface 72b. In the second embodiment, the other components of the magnetic recording head 58 and the HDD are identical to those of the above mentioned first embodiment. In the second embodiment configured as the above, also the same effect as that of the first embodiment can be obtained. In the second embodiment, the peripheral outer surface, except for the second emitting surface 72b of the second waveguide 68b, may be covered with the clad layer made of a material with a low refractive index.

Third Embodiment

Figure 10:
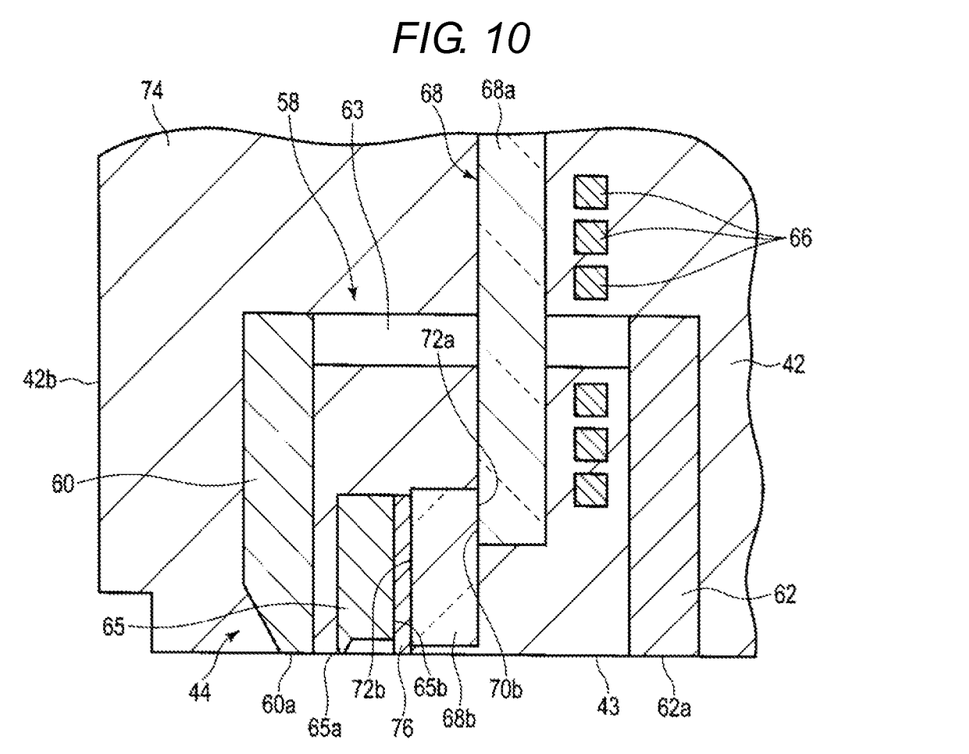
FIG. 10 is an enlarged cross-sectional view illustrating a head portion of a magnetic head in an HDD according to a third embodiment.

FIG. 10 is an enlarged cross-sectional view illustrating a magnetic recording head in HDD according to a third embodiment.

According to the third embodiment, the second waveguide 68b of the waveguide 68 is not aligned with the first waveguide 68a in a straight line shape but deviates from the straight line of the first waveguide 68a to the side of the near field light generating element 65. The side surface of the end portion of the first waveguide 68a on the floating surface 43 side forms the first emitting surface 70b. This first emitting surface 70b is substantially perpendicular to the floating surface 43 of the slider 42. The second incident surface 72a (boundary) of the second waveguide 68b is substantially perpendicular to the floating surface 43 of the slider 42. The second incident surface 72a of the second waveguide 68b faces and is parallel to the first emitting surface 70b of the first waveguide 68a and they are in contact with or joined with each other.

The first waveguide 68a and the second waveguide 68b have different refractive indices. In the third embodiment, the refractive index of the first waveguide 68a is lower than that of the second waveguide 68b.

The third incident surface 65b of the near field light generating element 65 faces and is substantially parallel to the second emitting surface 72b of the second waveguide 68b. In the embodiment, a low refractive index layer 76 with a refractive index lower than that of the second waveguide 68b is arranged between the third incident surface 65b and the second emitting surface 72b.

When a near field light is applied from the near field light generating element 65 to the magnetic disk 16, a laser light from the laser generating element 40 propagates through the first waveguide 68a while being repeatedly reflected on the inner wall surface of the core of the first waveguide 68a, and enters the second waveguide 68b through the first emitting surface 70b and the second incident surface 72a. The laser light propagates through the second waveguide 68b while being repeatedly reflected on the inner wall surface of the core of the second waveguide 68b. When the laser light is reflected on the second emitting surface 72b of the second waveguide 68b, the reflected light generates a surface plasmon outside the second emitting surface 72b (outside of the second waveguide 68b) and at the third incident surface 65b of the near field light generating element 65. This surface plasmon generated at the third incident surface 65b of the near field light generating element 65 is excited by the near field light generating element 65 to move towards the plasmon antenna 65a and become concentrated at the plasmon antenna 65a. From there, the near field light generating element 65 irradiates the recording layer 103 of the magnetic disk 16 with a near field light generated by the plasmon antenna 65a.

Figure 11:
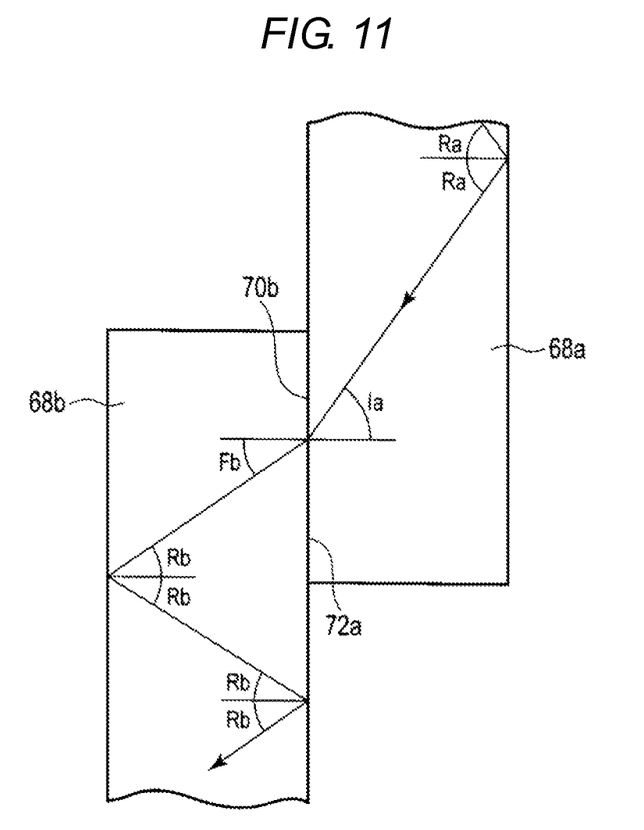
FIG. 11 is a view schematically illustrating a waveguide of the magnetic head according to the third embodiment.

In the magnetic recording head 58 according to the embodiment, the first waveguide 68a is formed with a refractive index lower than that of the second waveguide 68b. Therefore, as illustrated in FIG. 11, a laser light incident to the first waveguide 68a propagates through the first waveguide 68a while being repeatedly reflected on the inner wall surface of the core of the first waveguide 68a with a reflection angle Ra of 70° to 80° and more with respect to a line perpendicular to the wall surface. According to this, the first waveguide 68a can propagate a laser light to the vicinity of the near field light generating element 65 with a low propagation loss.

The laser light propagating through the first waveguide 68a enters the second waveguide 68b, passing through the first emitting surface 70b and the second incident surface 72a. Here, since the refractive index of the second waveguide 68b is higher than that of the first waveguide 68a, refraction occurs in the first emitting surface 70b and the second incident surface 72a and the refractive angle Fb on the second incident surface 72a becomes smaller than the incident angle Ia on the first emitting surface 70b. According to this, the reflection angle Rb of the laser light reflected on the inner wall surface of the core of the second waveguide 68b becomes smaller than the angle of 70° to 80° with respect to the line perpendicular to the wall surface. For example, when the first waveguide 68a is made of magnesium oxide with a refractive index 1.8 and the second waveguide 68b is made of titanium oxide with a refractive index 2.5, the reflection angle Ra=80° in the first waveguide 68a is changed to the reflection angle Rb=76° in the second waveguide 68b and the reflection angle Ra=70° in the first waveguide 68a is changed to the reflection angle Rb=62° in the second waveguide 68b.

According to this, energy can be efficiently propagated from the second waveguide 68b to the near field light generating element 65 while restraining a propagation loss of the laser light in the first waveguide 68a.

In the third embodiment, the other components of the magnetic head 33 and the HDD are identical to those of the above mentioned first embodiment. Also in the third embodiment configured as the above, a magnetic recording head capable of thermally-assisted recording with high efficiency and stability and a disk device including the same can be obtained.

Figure 12:
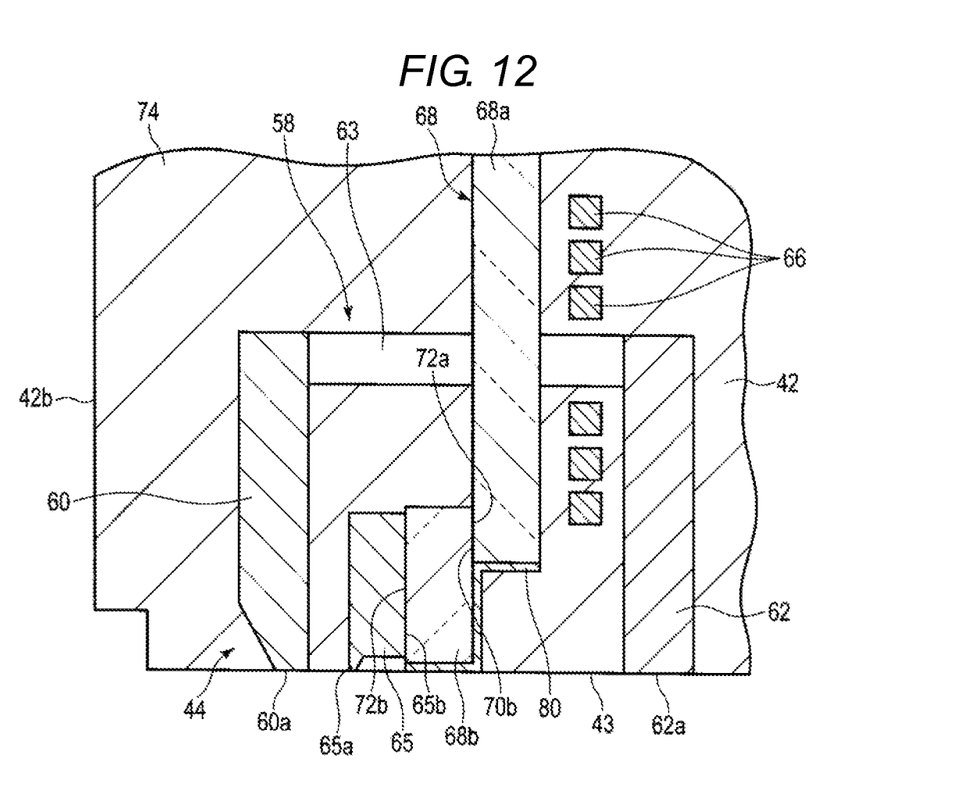
FIG. 12 is an enlarged cross-sectional view illustrating a head portion of a magnetic head according to a modified example.

In the third embodiment, as illustrated in FIG. 12, the third incident surface 65b of the near field light generating element 65 may be in contact with or joined with the second emitting surface 72b of the second waveguide 68b. Further, the peripheral outer surface of the second waveguide 68b, except for the second incident surface 72a and the second emitting surface 72b, may be covered with the clad layer 80 made of a material with a low refractive index.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, material, shape, and size of each element forming the head portion may be modified depending on necessity. Further, in the magnetic disk, the number of the magnetic disks and the magnetic heads may be increased depending on the necessity and the size of the magnetic disk may be changed variously.

What is claimed is:

1. A magnetic recording head comprising:
a magnetic pole that applies a recording magnetic field to a recording medium;
a light generating element configured to generate light to heat a recording surface of the recording medium; and
a waveguide on a leading side of the light generating element to guide an incident light to the light generating element, wherein
the waveguide includes:
a first waveguide having an incident surface into which the light enters, and
a second waveguide having a first surface facing the first waveguide, through which the light from the first waveguide enters, and a second surface facing the light generating element and extending substantially perpendicular to the recording surface of the recording medium, through which the light entering the light generating element passes,
a refractive index of the second waveguide being different from a refractive index of the first waveguide.

2. The magnetic recording head according to claim 1, wherein the first and second surfaces of the second waveguide are perpendicular to each other.

3. The magnetic recording head according to claim 1, wherein the first and second surfaces of the second waveguide are parallel to each other.

4. The magnetic recording head according to claim 3, wherein the first and second waveguides each extend in a direction perpendicular to the recording surface of the recording medium, but are not aligned along the direction.

5. The magnetic recording head according to claim 1, wherein
the light generating element is arranged between the second waveguide and the magnetic pole.

6. The magnetic recording head according to claim 1, further comprising:
a low-refractive-index layer that is provided between the light generating element and the second surface of the second waveguide, a refractive index of the low-refractive-index layer being lower than the refractive index of the second waveguide.

7. The magnetic recording head according to claim 1, wherein
the light generating element is in contact with and joined with the second surface of the second waveguide.

8. The magnetic recording head according to claim 1, further comprising:
a clad layer that is made of a material with a refractive index lower than the refractive index of the second waveguide and that covers a periphery of the second waveguide except for the second surface.

9. A disk device comprising:
a disk-shaped recording medium including a magnetic recording layer;
a driving unit that supports and rotates the recording medium;
a magnetic recording head including a magnetic pole that applies a recording magnetic field to a recording medium, a light generating element configured to generate light to heat a recording surface of the recording medium, and a waveguide on a leading side of the light generating element to guide an incident light to the light generating element; and a light source for the incident light that enters the waveguide and is guided by the waveguide,
wherein the waveguide includes:
a first waveguide having an incident surface into which the light enters, and
a second waveguide having a first surface facing the first waveguide, through which the light from the first waveguide enters, and a second surface facing the light generating element and extending substantially perpendicular to the recording surface of the recording medium, through which the light entering the light generating element passes,
a refractive index of the second waveguide being different from a refractive index of the first waveguide.

10. The disk device according to claim 9, wherein the first and second surfaces of the second waveguide are perpendicular to each other.

11. The disk device according to claim 9, wherein the first and second surfaces of the second waveguide are parallel to each other.

12. The disk device according to claim 11, wherein the first and second waveguides each extend in a direction perpendicular to the recording surface of the recording medium, but are not aligned along the direction.

13. The disk device according to claim 9, wherein the light generating element is arranged between the second waveguide and the magnetic pole.

14. The disk device according to claim 9, further comprising:
a low-refractive-index layer that is provided between the light generating element and the second surface of the second waveguide, a refractive index of the low-refractive-index layer being lower than the refractive index of the second waveguide.

15. The disk device according to claim 9, wherein
the light generating element is in contact with and joined with the second surface of the second waveguide.

16. The disk device according to claim 9, further comprising:
a clad layer that is made of a material with a refractive index lower than the refractive index of the second waveguide and that covers a periphery of the second waveguide except for the second surface.

17. A magnetic recording head for a disk device that includes a disk-shaped recording medium including a magnetic recording layer, a driving unit that supports and rotates the recording medium, and a light source, comprising:
a main magnetic pole that applies a recording magnetic field to the recording medium;
a light generating element configured to generate light to heat a recording surface of the recording medium; and
a waveguide on a side of the light generating element opposite to the main magnetic pole, the waveguide including a first waveguide having an incident surface into which light from the light source enters and a second waveguide having a first surface facing the first waveguide, through which the light from the first waveguide enters, and a second surface facing the light generating element and extending substantially perpendicular to the recording surface of the recording medium, through which the light entering the light generating element passes,
wherein a refractive index of the second waveguide is smaller than a refractive index of the first waveguide.

18. The magnetic recording head according to claim 17, further comprising:

a low-refractive-index layer interposed between the light generating element and the second surface of the second waveguide, wherein a refractive index of the low-refractive-index layer is lower than the refractive index of the second waveguide.

19. The magnetic recording head according to claim 18, further comprising:

a clad layer that is made of a material with a refractive index lower than the refractive index of the low-refractive-index layer and that covers a periphery of the second waveguide except for the second surface.

20. The magnetic recording head according to claim 19, wherein the clad layer has a portion that covers a periphery of the first waveguide.

* * * * *